United States Patent
Jain et al.

(10) Patent No.: US 9,462,163 B2
(45) Date of Patent: Oct. 4, 2016

(54) ROBUST SPATIOTEMPORAL COMBINING SYSTEM AND METHOD FOR VIDEO ENHANCEMENT

(75) Inventors: Chirag Jain, Meerut (IN); Sriram Sethuraman, Bangalore (IN)

(73) Assignee: ITTIAM SYSTEMS (P) LTD., Bangalore, Karnataka (IN)

( * ) Notice: Subject to any disclaimer, the term of this patent is extended or adjusted under 35 U.S.C. 154(b) by 1975 days.

(21) Appl. No.: 12/577,157

(22) Filed: Oct. 10, 2009

(65) Prior Publication Data

US 2011/0085084 A1   Apr. 14, 2011

(51) Int. Cl.
*H04N 7/12* (2006.01)
*H04N 5/213* (2006.01)
*G06T 5/00* (2006.01)
*G06T 5/50* (2006.01)
*H04N 5/14* (2006.01)
*H04N 19/176* (2014.01)
*H04N 19/117* (2014.01)
*H04N 19/14* (2014.01)
*H04N 19/137* (2014.01)
*H04N 19/86* (2014.01)

(52) U.S. Cl.
CPC ............. *H04N 5/213* (2013.01); *G06T 5/002* (2013.01); *G06T 5/50* (2013.01); *H04N 5/145* (2013.01); *H04N 19/117* (2014.11); *H04N 19/137* (2014.11); *H04N 19/14* (2014.11); *H04N 19/176* (2014.11); *H04N 19/86* (2014.11); *G06T 2207/10016* (2013.01); *G06T 2207/20021* (2013.01); *G06T 2207/20182* (2013.01); *G06T 2207/20221* (2013.01)

(58) Field of Classification Search
CPC ..................... G06T 5/002; G06T 5/50; G06T 2207/10016; G06T 2207/20021; G06T 2207/20182; G06T 2207/20221; H04N 5/145; H04N 5/213; H04N 19/176; H04N 19/117; H04N 19/14; H04N 19/137; H04N 19/86
USPC ....... 348/448, 598, 607; 375/240.16, 240.26, 375/240.29
IPC ....................................................... H04N 7/12
See application file for complete search history.

(56) References Cited

U.S. PATENT DOCUMENTS

| | | | |
|---|---|---|---|
| 2005/0105627 A1* | 5/2005 | Sun et al. | 375/240.29 |
| 2008/0151101 A1* | 6/2008 | Tian et al. | 348/448 |
| 2008/0204600 A1* | 8/2008 | Xu et al. | 348/607 |
| 2010/0290530 A1* | 11/2010 | Huang et al. | 375/240.16 |
| 2011/0255610 A1* | 10/2011 | Kameyama et al. | 375/240.26 |

* cited by examiner

*Primary Examiner* — Gims Philippe
*Assistant Examiner* — Richard Carter
(74) *Attorney, Agent, or Firm* — Prakash Nama; Global IP Services, PLLC (57) ABSTRACT

A system and method for a low complexity and robust spatiotemporal combining for video enhancement is disclosed. In one embodiment, the method includes computing a standard deviation estimate between a video frame and a temporally neighboring frame of the video frame in a video sequence, computing an error value, for each sub-block of pixels within a block of pixels in a current video frame, between pixel values within the sub-block in the current video frame and corresponding motion compensated pixel values in a temporally neighboring video frame of the current video frame, computing a temporal weighting factor for each sub-block of pixels as a function of the error value and the standard deviation estimate, and combining the block of pixels in the current video frame and their corresponding motion compensated pixel values in the temporally neighboring video frame using the computed temporal weighting factor.

35 Claims, 9 Drawing Sheets

ROBUST SPATIOTEMPORAL COMBINING SYSTEM AND METHOD FOR VIDEO ENHANCEMENT

FIELD OF TECHNOLOGY

Embodiments of the present invention relate to the field of video processing. More particularly, embodiments of the present invention relate to a system and method for robust spatiotemporal combining for video enhancement.

BACKGROUND

Video enhancement algorithms are employed for enhancing the quality, resolution, or frame-rate of video frames in a video sequence or to enhance a still picture output using multiple captured images. These algorithms typically combine spatial and temporal information in an intelligent manner. Noise reduction, exposure correction using multiple images, and super-resolution image generation are some applications of such spatiotemporal combining. Typical spatiotemporal combining methods suffer from either a very high computational complexity or from artifacts due to lack of robustness in the combining process arising from poor temporal registration.

Camera captured video content is prone to a lot of noise, particularly, when the lighting conditions are not ideal or the camera aperture/exposure settings cannot be intelligently adjusted. The noise in video influences the bit-rate and visual quality of video encoders and can significantly alter the effectiveness of video processing algorithms. Further, the noise leads to introduction of coding artifacts at a given bit-rate. This typically requires video processing algorithms to do a lot of fine-tuning in the presence of noise to be effective. Hence, de-noising is a key pre-processing operation in video or still image encoders. The key challenge in de-noising is in achieving the noise reduction while preserving the underlying spatiotemporal signal from artifacts such as spatial blur, motion blur, motion artifacts, and temporal flicker.

The image and video de-noising problems have been the target of active research for over two decades. From simple spatial averaging, the methods have evolved to include coring/shrinkage based methods in the wavelet domain and motion compensated temporal filtering. These techniques have a fairly high computational complexity because they involve a fairly large spatiotemporal support volume and require intelligent means of determining the weights needed to combine the pixels according to their similarity to the neighborhood of the pixel being de-noised. In addition, the several simple to complex noise estimation techniques have been studied with varying degrees of success to control the level of filtering according to the actual noise variance. Recent advances offer high quality de-noising at a fairly high computational complexity by increasing the spatiotemporal support and evaluating intelligent weights for combining these samples to remove noise while preserving the signal.

BRIEF DESCRIPTION OF THE DRAWINGS

Embodiments of the present invention are illustrated by way of an example and not limited to the figures of the accompanying drawings, in which like references indicate similar elements and in which.

Other features of the present embodiments will be apparent from the accompanying drawings and from the detailed description that follows.

DETAILED DESCRIPTION

A system and method for robust spatiotemporal combining for video enhancement is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

The terms "frame" and "video frame" are used interchangeably throughout the document. Further, the terms "spatial filter" and "spatial combining module" are used interchangeably throughout the document. Furthermore, the terms "temporal IIR filter" and "spatiotemporal combining module" are used interchangeably throughout the document.

The present invention provides a low complexity, robust spatiotemporal combining method that only requires a small spatiotemporal region of support by using the following principles:

1. Block-based noise estimation and temporal weighting factor computation,
2. Use of block motion vectors,
3. Use of an Infinite Impulse Response (IIR) temporal filter to reduce the complexity,
4. Spatial filter with minimal spatial support that is optimal for an estimated noise variance,
5. Simple, but robust, spatially adaptive weight selection for the spatiotemporal IIR (ST-IIR) combining, and
6. Use of the weights in the estimation of the noise variance.

Figure 1:
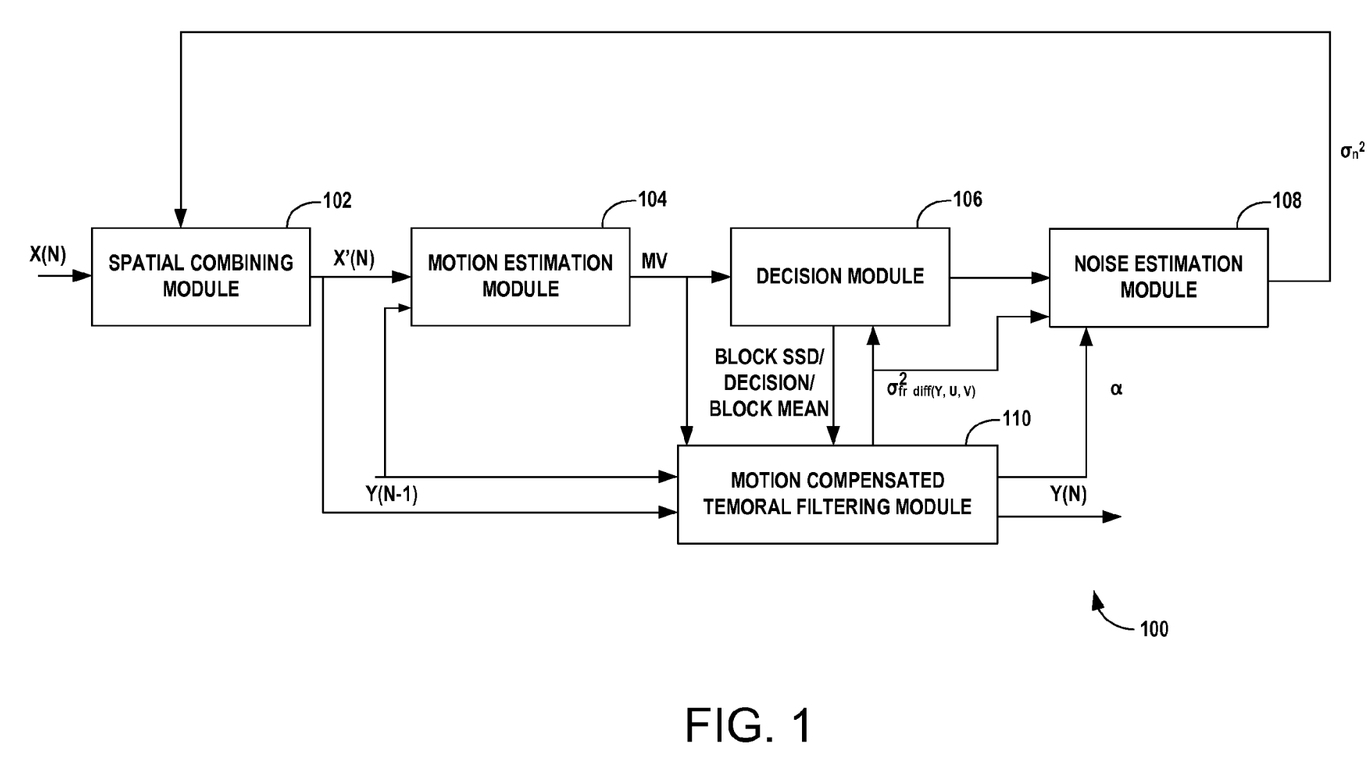
FIG. 1 is a block diagram of a spatiotemporal combining module, according to one embodiment.

FIG. 1 is a block diagram of a spatiotemporal combining module 100, according to one embodiment. Particularly, the spatiotemporal combining module 100 includes a spatial combining module 102, a motion estimation module 104, a decision module 106, a noise estimation module 108, and a motion compensated temporal filtering module 110.

In operation, the spatial combining module 102 spatially combines a block of pixels in a current video frame (X(n)) of a video sequence using a noise variance estimate of the current video frame and the pixel values within a spatial neighborhood in and around the block of pixels. In one exemplary implementation, the spatially combined output (X'(n)) of the spatial combining module 102 is supplied to the motion estimation module 104 and the motion compensated temporal filtering module 110 as shown in FIG. 1.

Further, the motion estimation module 104 estimates a motion correspondence between spatially combined block of component pixels in the current video frame and a matching block of component pixels in the temporally neighboring video frame of the current video frame. In one example embodiment, the component pixels are selected from the group consisting of luminance pixels (Y) and chrominance pixels (U, V). The motion information (MV) is outputted to the decision module 106 and the motion compensated temporal filtering module 110 as shown in FIG. 1.

The motion compensated temporal filtering module 110 computes a standard deviation estimate between a video frame and a temporally neighboring frame of the video frame in the video sequence. Further, the motion compensated temporal filtering module 110 computes a frame difference variance ($\sigma_{fr\_diff}^2$) for each of the components (i.e., Y, U, V) using the standard deviation estimate. In one example embodiment, the frame difference variance is the square of the standard deviation estimate for each of the components. The motion compensated temporal filtering module 110 outputs the frame difference variance of the components to the decision module 106 and the noise estimation module 108.

Furthermore, the decision module 106 computes a sum of sum of squared differences (Sum of SSDs) of the components in the block of pixels in the current video frame, between pixel values in the current video frame and the corresponding motion compensated pixel values in the temporally neighboring video frame of the current video frame. For example, the components include luminance (Y) and chrominance (U, V) parts of the video sequence. The decision module 106 then determines whether the computed sum of SSDs of the components in the block of pixels in the current video frame is less than a factor of the sum of frame difference variance of the components. Further, the decision module 106 outputs the block SSD/decision/block mean to the motion compensated temporal filtering module 110. For example, the block mean is an average of all the pixels within a block.

If the computed sum of SSDs of the components in the block of pixels in the current video frame is less than the factor of the sum of frame difference variance of the components, the motion compensated temporal filtering module 110 computes an error value, for each sub-block of pixels within the block of pixels in the current video frame, between pixel values within the sub-block in the current video frame and corresponding motion compensated pixel values in a temporally neighboring video frame of the current video frame. Further, the motion compensated temporal filtering module 110 computes a temporal weighting factor ($\alpha$) for each sub-block of pixels as a function of the error value and the standard deviation estimate. In one example embodiment, the motion compensated temporal filtering module 110 computes the temporal weighting factor for each sub-block of pixels as an exponential function of the error value and the standard deviation estimate.

If the computed sum of SSDs of the components in the block of pixels in the current video frame is greater than or equal to the factor of the sum of frame difference variance of the components, the motion compensated temporal filtering module 110 sets the temporal weighting factor for each sub-block in the block of pixels to zero.

Furthermore, the motion compensated temporal filtering module 110 combines the block of pixels in the current video frame and their corresponding motion compensated pixel values in the temporally neighboring video frame using the computed temporal weighting factor of each sub-block of pixels in the block of pixels. In one example embodiment, the motion compensated temporal filtering module 110 combines the spatially combined block of pixels and their corresponding motion compensated pixel values in the temporally neighboring video frame of the current video frame using the computed temporal weighting factor of each sub-block of pixels in the block of pixels and the estimated motion correspondence in the motion estimation module 104.

Furthermore, the noise estimation module 108 receives the temporal weighting factor of each sub-block of pixels and the frame difference variance of the components from the motion compensated temporal filtering module 110. The noise estimation module 108 then computes an average of all the computed temporal weighting factors in each component of the video frame, and estimates the noise variance of each component based on the computed average and the frame difference variance of each component.

Figure 2:
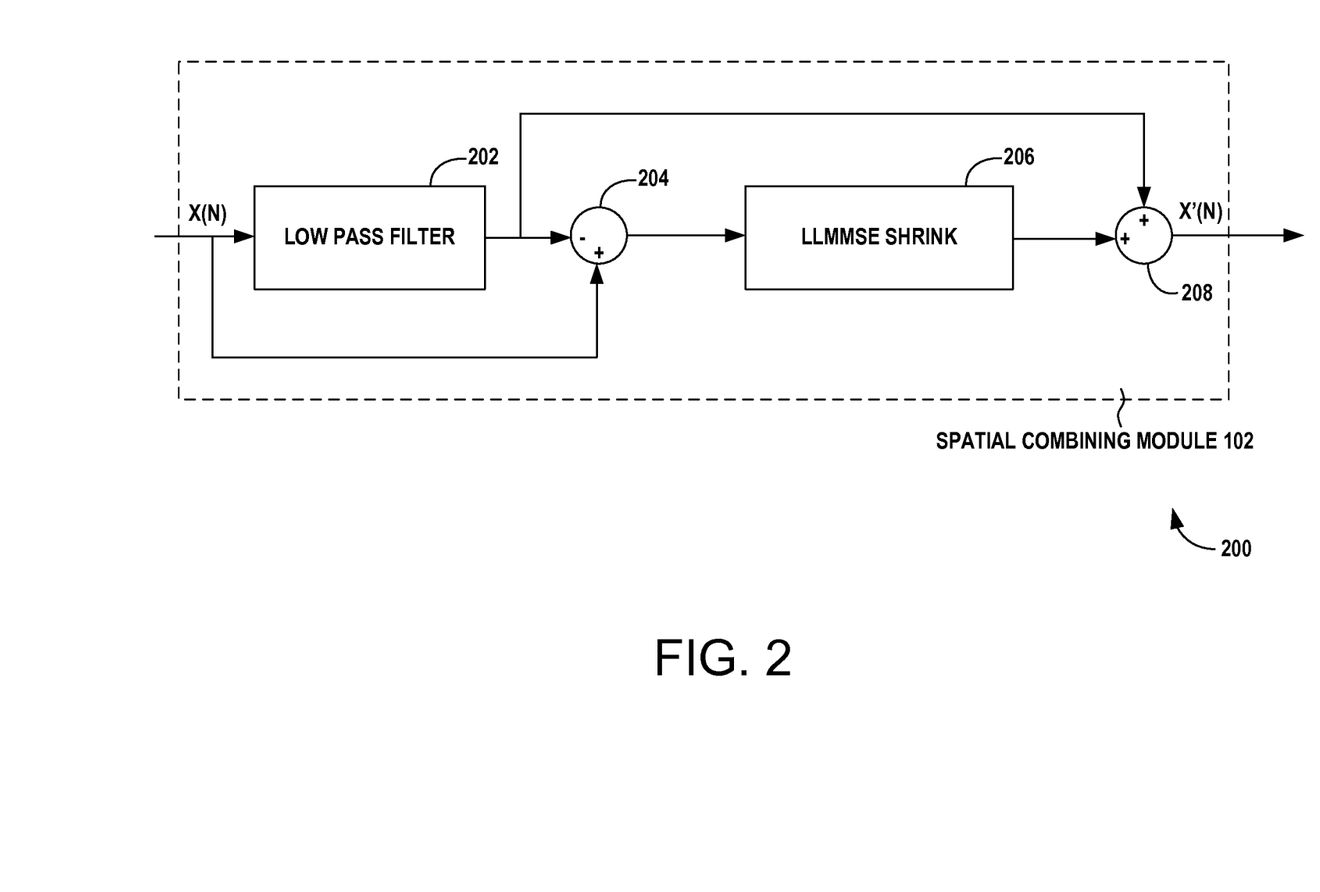
FIG. 2 is an exploded view of a spatial combining module of FIG. 1, according to one embodiment.

FIG. 2 is an exploded view 200 of the spatial combining module 102 of FIG. 1, according to one embodiment. In one embodiment, the spatial combining module 102 spatially combines the block of pixels in the current video frame of the video sequence using a noise variance estimate of the video frame and the pixel values within a spatial neighborhood in and around the block of pixels. Particularly, the spatial combining module 102 includes a low pass filter (LPF) 202, a subtractor 204, a locally adaptive linear minimum mean square error (LLMMSE) shrink 206, and an adder 208.

In operation, an input block of pixels in the current video frame (X(n)) is passed through the LPF 202 to obtain a low pass filtered output (L). In one example embodiment, the LPF 202 includes an n×n Gaussian filter. For example, the low pass filtered output is computed for a 3×3 block of pixels. Further, the low pass filtered output is then subtracted (e.g., using the subtractor 204) from the input block of pixels X(n) to obtain a high pass filtered output (H).

The LLMMSE shrink 206 computes spatial variance of the noisy signal $\sigma_f^2$ for every 8×8 block in the current video frame to determine the level of shrinkage of high pass filtered output. In one example embodiment, for any pixel in the current frame X(i,j), the LLMMSE based spatially filtered output X'(i,j) is computed using the equation:

$$X'(i, j) = L(i, j) + \frac{\sigma_f^2 - \sigma_n^2}{\sigma_f^2} * H(i, j) * m$$

where, $\sigma_n^2$ is the estimated noise variance of the video sequence, and m is the spatial filtering modulation factor.

In one example embodiment, the low pass filtered output (L) and the output of the LLMMSE shrink 206 are combined using the adder 208 to obtain the spatially filtered output X'(i,j). The use of spatial variance of the signal captures the amount of texture content in the block and regulates the level of filtering accordingly. In one exemplary implementation, the spatial filtering modulation factor (m) is a user controlled parameter to select the level of spatial filtering. The value of m varies from 0 to 1. Higher the value of m, lower is the level of filtering.

Figure 3:
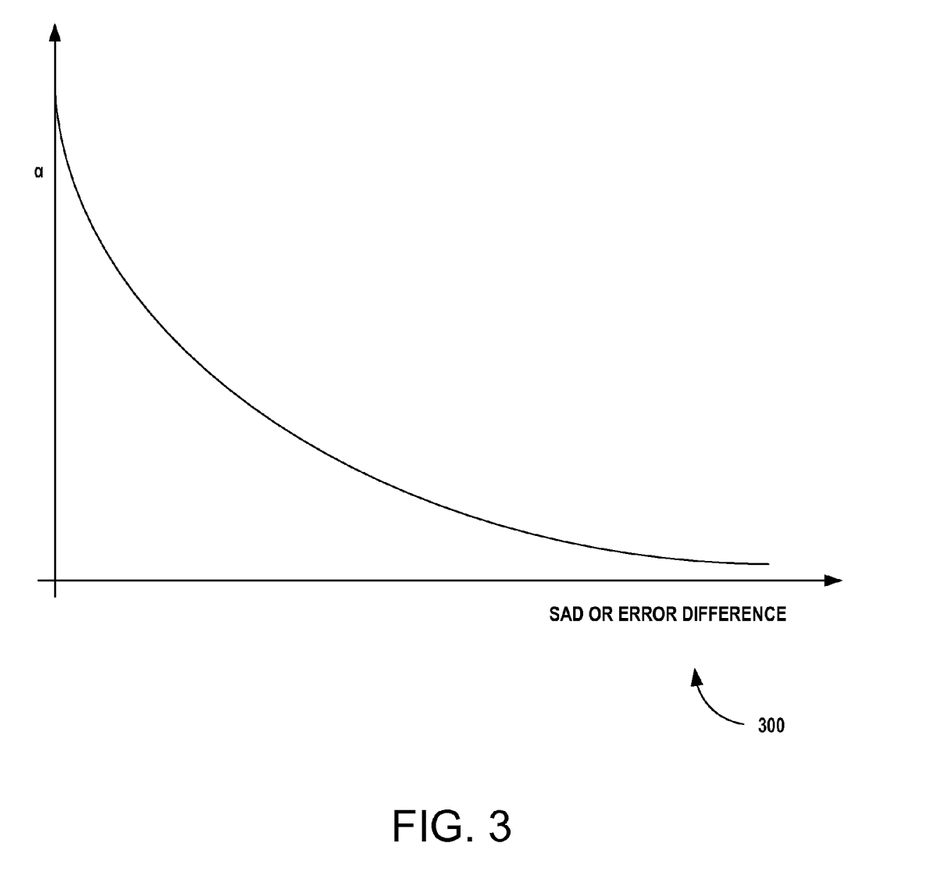
FIG. 3 is a graph illustrating error difference versus temporal weighting factor, in accordance with the principles of the present invention.

FIG. 3 is a graph 300 illustrating error difference versus temporal weighting factor, in accordance with the principles of the present invention. As illustrated in FIG. 3, error difference represents the error value for each sub-block of pixels within the block of pixels in the current video frame, and a represents the temporal weighting factor for each sub-block of pixels within the block of pixels. It can be noted from FIG. 3, that the temporal weighting factor decreases with the increase in the error difference. The exponential curve as shown in FIG. 3 is a fast decaying curve which preserves the signal by ensuring a low level of temporal filtering for pixels with a higher difference and ensures a robust means of temporal combining.

Figure 4:
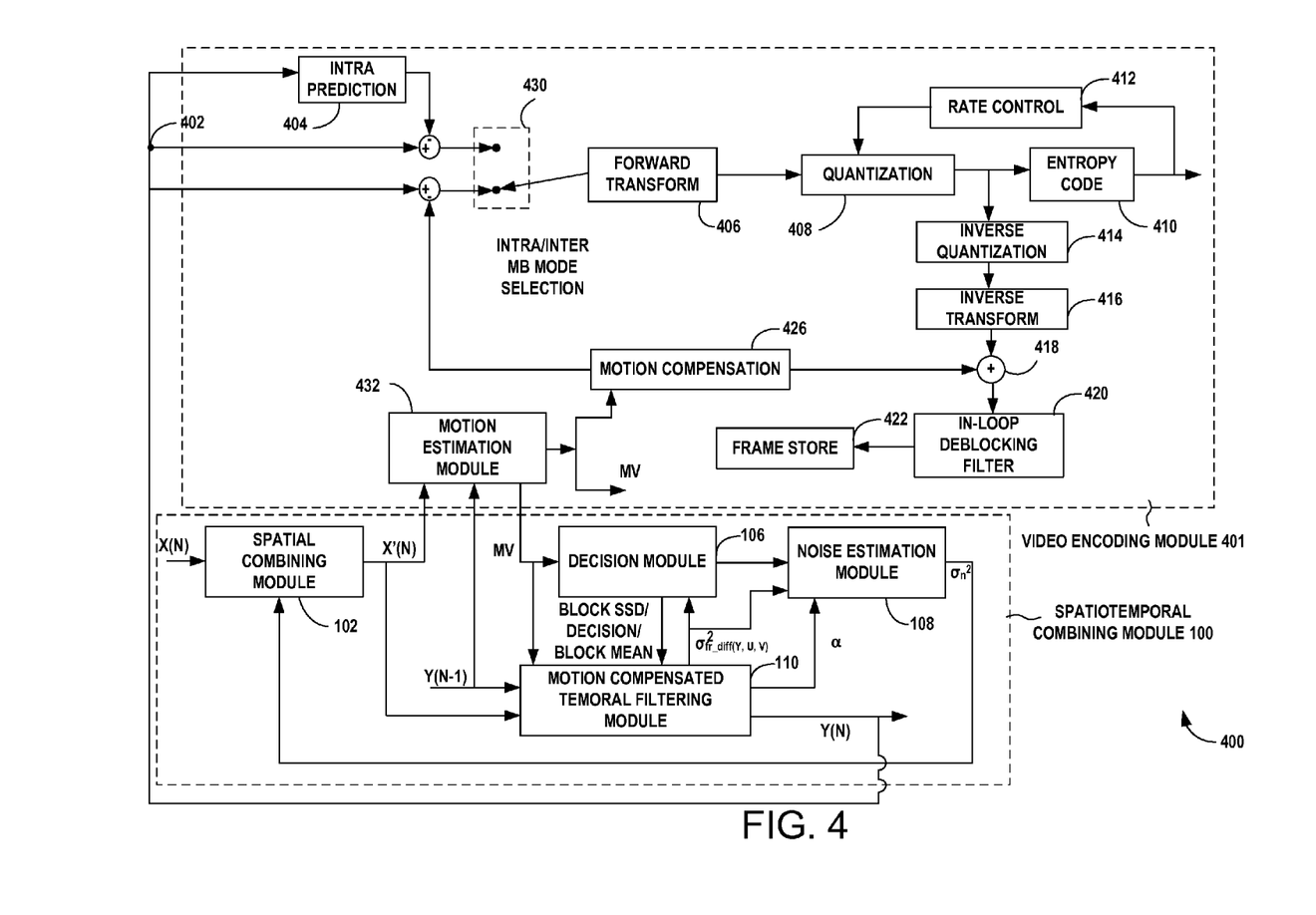
FIG. 4 is a block diagram of a video encoder, according to one embodiment.

FIG. 4 is a block diagram of a video encoder 400, according to one embodiment. Particularly, the video encoder 400 includes a video encoding module 401 and the spatiotemporal combining module 100 which are coupled as shown in FIG. 4. The video encoding module 401 receives input video frames 402 and process the video frames 402 through various processing blocks. As illustrated in FIG. 4, the video encoding module 401 includes an intra prediction block 404, forward transform block 406, quantization block 408, inverse quantization block 414, inverse transform block 416, motion compensation block 426, and motion estimation module 432. The video encoding module 401 further includes an adder 418 to receive signals from the blocks 416 and 426 and send an output to the frame store at 422 via an in-loop deblocking filter 420. The motion estimation module 432 coupled to the motion compensation block 426 provides a motion vector. Entropy code block 410 provides the output encoded video frame. A feedback is provided to the quantization block 408 via rate control block 412. Further, the Intra/Inter macroblock (MB) mode selection block 430 performs intra vs. inter MB coding mode selection. Additional details about the operation of individual blocks should be intelligible to those skilled in the art.

The subject matter resides in the spatiotemporal combining module 100. As shown in FIG. 4, the video encoder 400 includes the spatiotemporal combining module 100 coupled to the video encoding module 401. Particularly, the spatiotemporal combining module 100 includes the spatial combining module 102, the decision module 106, the noise estimation module 108 and the motion compensated temporal filtering module 110. Further, the functions associated with each of the spatial combining module 102, the decision module 106, the noise estimation module 108 and the motion compensated temporal filtering module 110 are explained with respect to FIG. 1.

In the example embodiment illustrated in FIG. 4, the output (X'(n)) of the spatial combining module 102 is supplied to the motion estimation module 432 of the video encoder. Further, the output video frame Y(n) of the spatiotemporal combining module 100 is inputted to the video encoding module 401. Furthermore, the spatiotemporal combining module 100 re-uses the motion information (MV) available from the motion estimation module 432 of the video encoding module 401 as shown in FIG. 4 to combine the spatially combined block of pixels and their corresponding motion compensated pixel values.

Figure 5:
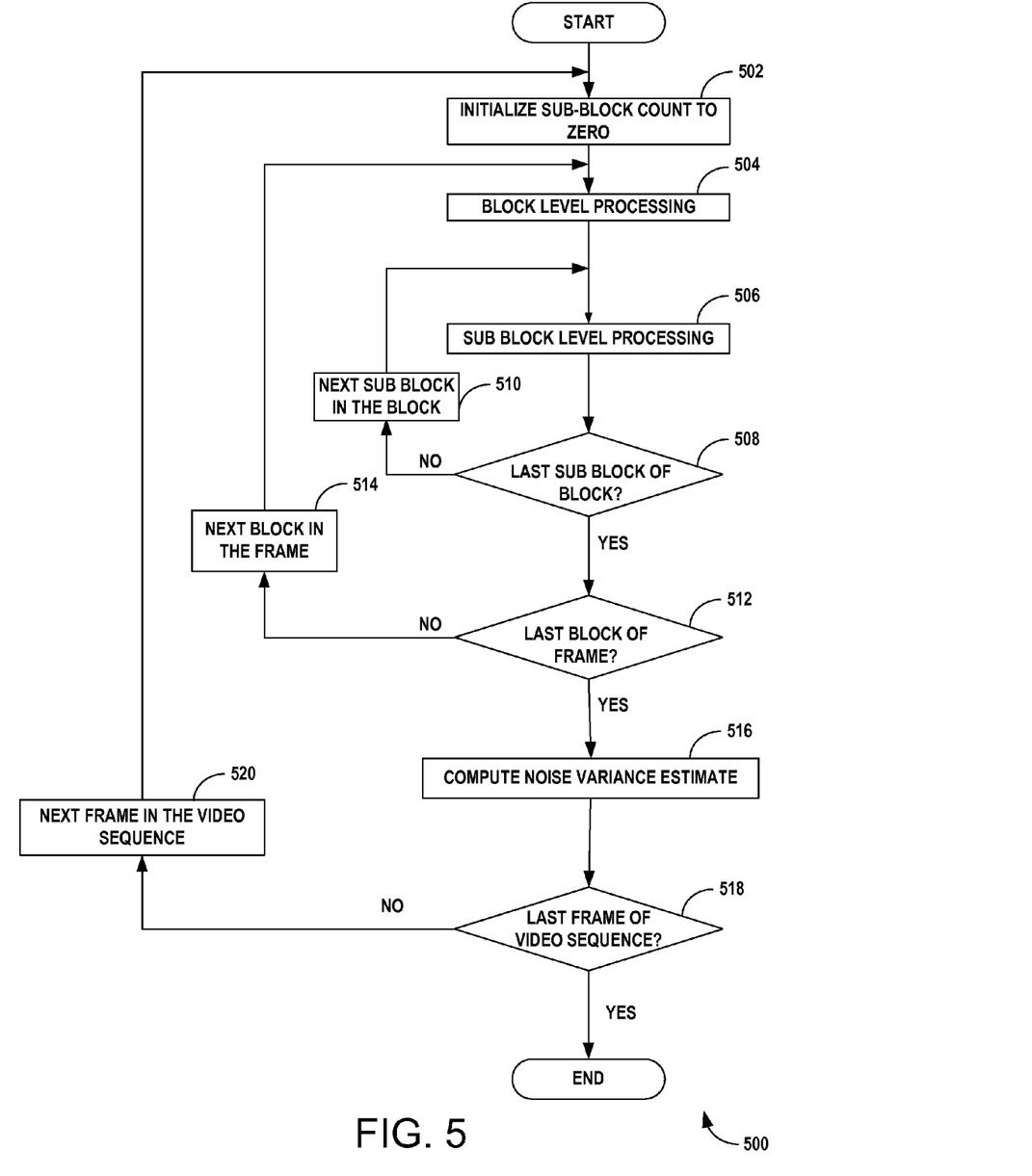
FIG. 5 is a flow chart illustrating the spatiotemporal combining method for video enhancement in each of the components of a video sequence, according to one embodiment.

FIG. 5 is a flow chart illustrating a spatiotemporal combining method for video enhancement in each of the components of a video sequence, according to one embodiment. In step 502, a "sub-block count" is initialized to zero. In step 504, a block level processing associated with a block of pixels in a current video frame of the video sequence is performed. The steps associated with the block level processing are explained in more detail with respect to FIG. 5A. In step 506, a sub-block level processing associated with a sub-block within the block of pixels is performed. The steps associated with the sub-block level processing is explained in more detail with respect to FIG. 5B.

In step 508, a check is made to determine whether the last sub-block within the block of pixels is processed at the sub-block level processing. If not, the process 500 updates the sub-block to a next sub-block in the block of pixels in step 510 and repeats the step 506.

If the last sub-block within the block of pixels is processed, a check is made to determine whether the last block of pixels in the current video frame is processed at the block level processing in step 512. If not, the process 500 updates the block of pixels to a next block of pixels in the current video frame in step 514 and repeats the steps 504-512 as shown in FIG. 5.

If the last block in the current video frame is processed, a noise variance estimate for the current video frame is computed at step 516. The steps associated with the computation of noise variance estimate are explained in more detail with respect to FIG. 5C.

In step 518, a check is made to determine whether the last frame of the video sequence is processed. If not, the process 500 updates the current video frame to a next video frame in the video sequence in step 520 and repeats the steps 502-518 as shown in FIG. 5. The process terminates, if the last frame of the video sequence is processed.

Figure 5A:
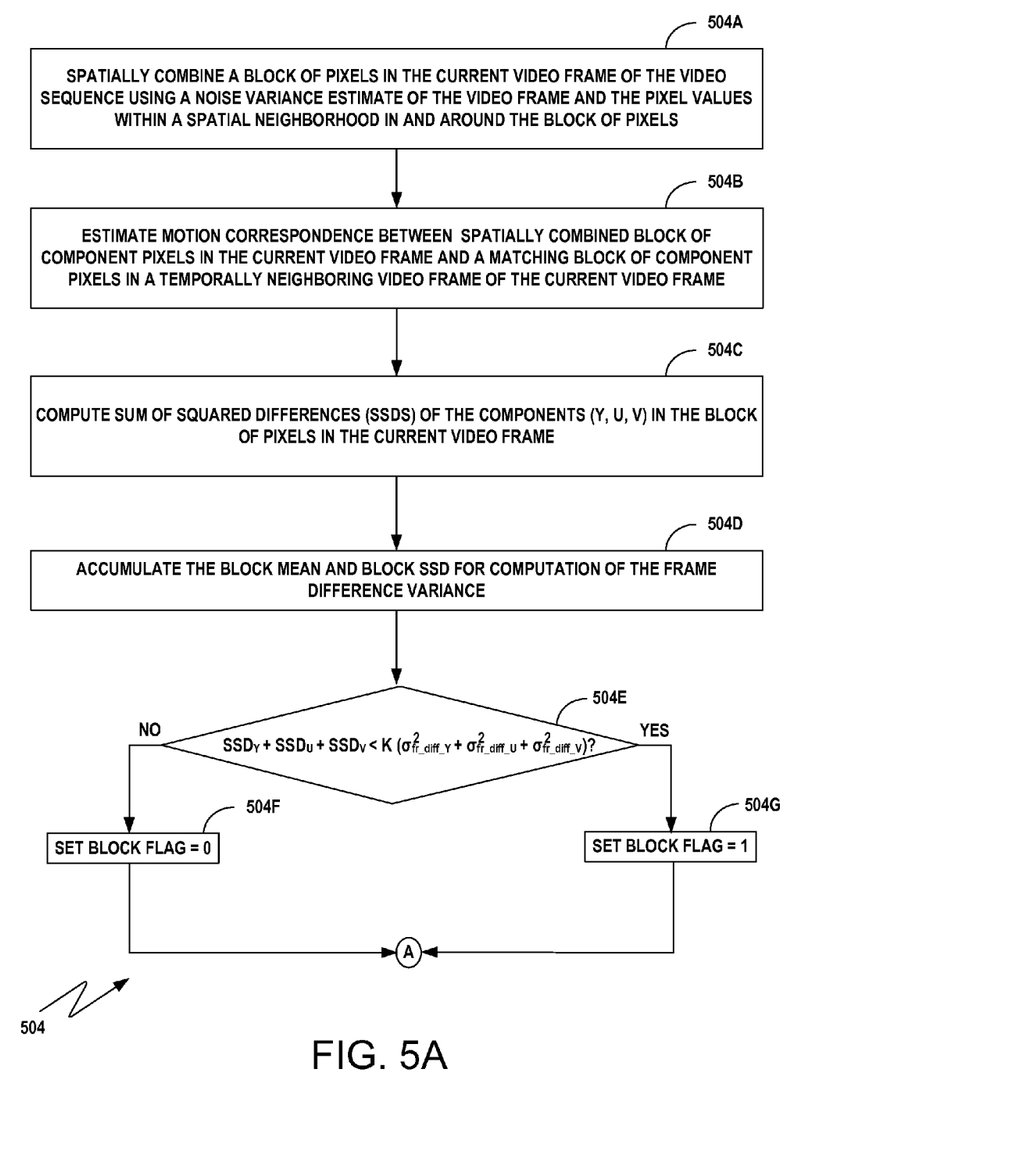
FIG. 5A is a flow chart illustrating the block level processing step of FIG. 5, according to one embodiment.

FIG. 5A is a flow chart illustrating the block level processing step 504 of FIG. 5, according to one embodiment. In step 504A, the block of pixels in the current video frame of the video sequence is spatially combined using a noise variance estimate of the video frame and the pixel values within a spatial neighborhood in and around the block of pixels.

In step 504B, motion correspondence between spatially combined block of component pixels in the current video frame and a matching block of component pixels in the temporally neighboring video frame of the current video frame is estimated. In one example embodiment, the component pixels are selected from the group consisting of luminance pixels and chrominance pixels. For example, the motion correspondence may involve simple models such as translational motion model, advanced motion correspondence methods such as optical flow techniques, global motion models such as affine, or perspective motion models.

In step 504C, sum of squared differences (SSDs) of the components (Y, U, V) in the block of pixels in the current video frame are computed. In these embodiments, sum of SSDs of the components (i.e., $SSD_Y + SSD_U + SSD_V$) in the block of pixels in the current video frame is computed, between pixel values in the current video frame and the corresponding motion compensated pixel values in the temporally neighboring video frame of the current video frame.

In step 504D, the block mean and SSD are accumulated for later computation of the frame difference variance. For example, the block mean is an average of all the pixels within a block.

In step 504E, a check is made to determine whether the computed sum of SSDs of the components in the block of pixels in the current video frame is less than a factor (K) of the sum of frame difference variance of the components (i.e., $\sigma_{fr\_diff\_Y}^2 + \sigma_{fr\_diff\_U}^2 + \sigma_{fr\_diff\_V}^2$). In these embodiments, a standard deviation estimate between a video frame and a temporally neighboring frame of the video frame in the video sequence is computed. In one example embodiment, the frame difference variance is the square of the standard deviation estimate for each of the components.

If the computed sum of SSDs of the components in the block of pixels in the current video frame is less than a factor (K) of the sum of frame difference variance of the components, the process goes to step 504G. In step 504G, a block flag is set to 1.

If the computed sum of SSDs of the components in the block of pixels in the current video frame is greater than or equal to a factor (K) of the sum of frame difference variance of the components, the process goes to step 504F. In step 504F, the block flag is set to 0. Further, the process from steps 504F and 504G goes to the connector A.

Figure 5B:
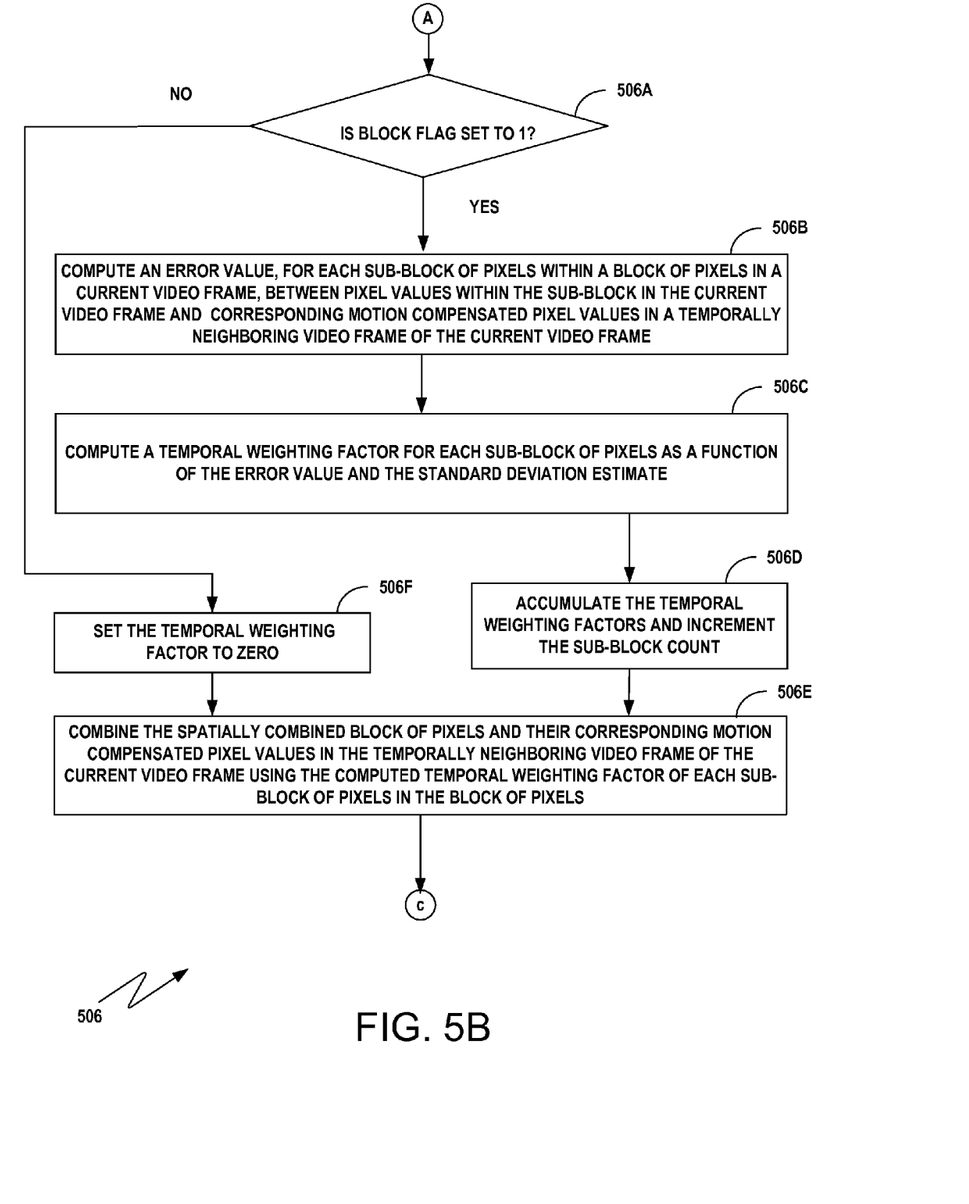
FIG. 5B is a flow chart illustrating the sub-block level processing step of FIG. 5, according to one embodiment.

FIG. 5B is a flow chart illustrating the sub-block level processing step 506 of FIG. 5, according to one embodiment. In step 506A, the block flag is checked for a value of 1. If the value of the block flag is 1, the process goes to step 506B. If the value of the block flag is not equal to 1, the process goes to step 506F.

In step 506B, an error value is computed, for each sub-block of pixels within the block of pixels in the current video frame, between pixel values within the sub-block in the current video frame and corresponding motion compensated pixel values in a temporally neighboring video frame of the current video frame.

In step 506C, a temporal weighting factor for each sub-block of pixels is computed as a function of the error value and the standard deviation estimate. In one example embodiment, the temporal weighting factor for each sub-block of pixels is computed as an exponential function of the error value and the standard deviation estimate. In one exemplary implementation, the temporal weighting factor is computed using the equation:

$$\alpha = e^{-\frac{m*(err\_subblk)}{\sigma_{fr\_diff}}}$$

where, $\alpha$ is the temporal weighting factor for a sub-block of pixels, err_subblk is the error value for the sub-block, $\sigma_{fr\_diff}$ is the standard deviation estimate, and m is a temporal filtering modulation factor.

In one example embodiment, the err_subblk is computed as the sum of absolute differences of the pixel values of the sub-block in the current video frame and their corresponding motion compensated pixel values in a temporally neighboring video frame.

Further, the temporal filtering modulation factor is computed using the equation:

$$m = \frac{\mu blk * k + 128}{\mu blk + 128 * k}$$

where, μblk is a spatial mean of the luminance component of the block of pixels in the current video frame, and k is a factor to control the level of modulation. This modulation allows the level of filtering to be adjusted based on the local brightness in the sub-block. In one embodiment, the constant factor k varies from 1 to 2.

In step 506D, the temporal weighting factors of each of the sub-blocks are accumulated and the sub-block count is incremented to next sub-block in the block of pixels. In step 506E, the spatially combined block of pixels and their corresponding motion compensated pixel values in the temporally neighboring video frame of the current video frame are combined using the computed temporal weighting factor of each sub-block of pixels in the block of pixels. In one example embodiment, the spatially combined block of pixels and their corresponding motion compensated pixel values computed using the estimated correspondence between the spatially combined block of component pixels in the current video frame and the matching block of component pixels in the temporally neighboring video frame are combined using the computed temporal weighting factor of each sub-block of pixels in the block of pixels.

In step 506F, a zero value is assigned to the temporal weighting factor of each sub-block in the block of pixels. The process goes to step 506E in which the spatially combined block of pixels and their corresponding motion compensated pixel values in the temporally neighboring video frame of the current video frame are combined using the computed temporal weighting factor of each sub-block of pixels in the block of pixels. In this case, it should be noted that this is equivalent to only using the spatially combined sub-block of pixels as the temporal weighting factors of each sub-block within the block of pixels have been set to zero.

In one example embodiment, the temporally combined output for a sub-block of pixels is given by $$Y(n, i, j) = \alpha Y_{mc}(n-1, i, j) + (1-\alpha) X(n, i, j),$$

where Y(n) is the spatiotemporally combined video frame, i and j are pixels in Y(n) belonging to the current sub-block, $Y_{mc}(n-1, i, j)$ is the motion-compensated sample corresponding to Y(n,i,j) in a temporally neighboring frame, and X(n, i, j) corresponds to the pixel at (i,j) in the current video frame.

In another example embodiment, the spatiotemporally combined output for a sub-block of pixels is given by $$Y(n, i, j) = \alpha Y_{mc}(n-1, i, j) + (1-\alpha) X'(n, i, j),$$

where Y(n) is the spatiotemporally combined video frame, i and j are pixels in Y(n) belonging to the current sub-block, $Y_{mc}(n-1, i, j)$ is the motion-compensated sample corresponding to Y(n,i,j) in a temporally neighboring frame, and X'(n,i,j) corresponds to the spatially combined pixel at (i,j).

Figure 5C:
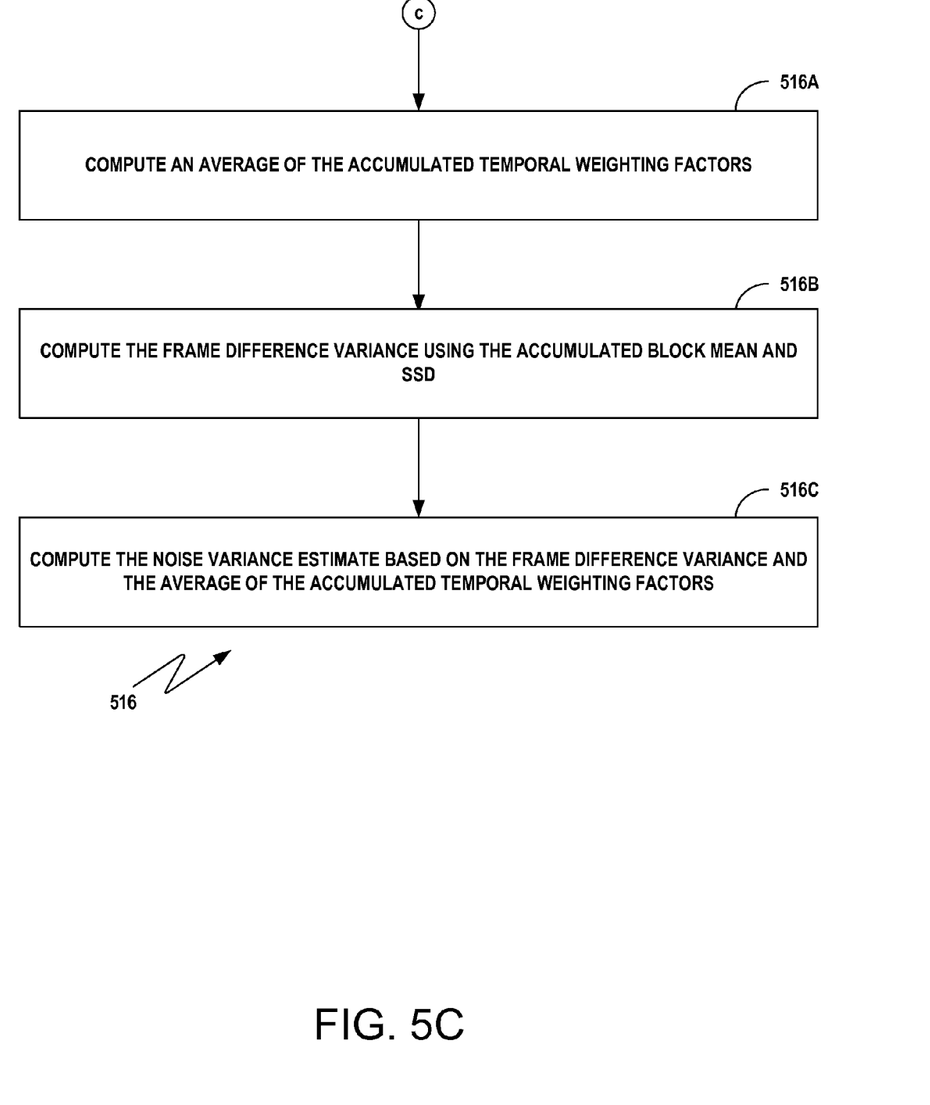
FIG. 5C is a flow chart illustrating the computing of the noise variance estimate step of FIG. 5, according to one embodiment.

FIG. 5C is a flow chart illustrating the computing of the noise variance estimate step 516 of FIG. 5, according to one embodiment. In step 516A, an average of all the accumulated temporal weighting factors for each component in the video frame is computed. In step 516B, the frame difference variance of each component is computed using the accumulated block mean and the SSD of each component. In step 516C, the noise variance estimate of each component is computed based on the frame difference variance and the average of the accumulated temporal weighting factors.

In one embodiment, the noise variance estimate for each component is estimated based on the computed average using the equation:

$$\sigma_n^2 = \sigma_{fr\_diff}^2 / (2-c)$$

where, $\sigma_n^2$ is the noise variance estimate of the component, $\sigma_{fr\_diff}^2$ is the square of the standard deviation estimate of the component, and c is the computed average of all the computed temporal weighting factors for the component.

In an alternate embodiment, the standard deviation estimate is computed between a region of pixels in a video frame and co-located region of pixels in a temporally neighboring frame of the video frame, and the temporal weighting factor is computed for each sub-block of pixels in the region of pixels as a function of the error value and the computed standard deviation estimate.

In another embodiment of the present invention, a spatiotemporal combining method for video enhancement, includes computing a standard deviation estimate between a video frame and a temporally neighboring frame of the video frame in the video sequence, computing an error value, for each sub-block of pixels within a block of pixels in a current video frame, between pixel values within the sub-block in the current video frame and corresponding motion compensated pixel values in a temporally neighboring video frame of the current video frame, computing a temporal weighting factor for each sub-block of pixels as a function of the error value and the standard deviation estimate, repeating the steps of computing the error value and computing the temporal weighting factor for each sub-block of pixels with respect to one or more additional temporally neighboring video frames, and combining the block of pixels in the current video frame and their corresponding motion compensated pixel values in the temporally neighboring video frames using the computed temporal weighting factors of each sub-block of pixels in the block of pixels.

In one example embodiment, combining the block of pixels and their corresponding motion compensated pixel values in the temporally neighboring video frame includes spatially combining a block of pixels in the current video frame of the video sequence using a noise variance estimate of the video frame and the pixel values within a spatial neighborhood in and around the block of pixels, and combining the spatially combined block of pixels and their corresponding motion compensated pixel values in the temporally neighboring video frames of the current video frame using the computed temporal weighting factors of each sub-block of pixels in the block of pixels.

In an example embodiment, the spatiotemporally combined output for a sub-block of pixels in a frame or image X(n) is given by $$Y(n, i, j) = \frac{\alpha X'_{mc}(n-1, i, j) + \beta X'_{mc}(n+1, i, j) + X'(n, i, j)}{(1 + \alpha + \beta)},$$

where Y(n) is the spatiotemporally combined video frame or image, i and j are pixels in Y(n) belonging to the current sub-block, $X'_{mc}(n-1, i, j)$ and $X'_{mc}(n+1, i, j)$ are motion-compensated spatially combined samples corresponding to X(n,i,j) in the temporally neighboring frames or images, X'(n,i,j) corresponds to the spatially combined pixel at (i,j), and $\alpha$, $\beta$ are the computed temporal weighting factors for the sub-block for the pair of frames (n, n−1) and (n, n+1) respectively. The combined output frame can further be scaled, as necessary, to increase the dynamic range of pixel values.

In yet another embodiment of the present invention, the spatiotemporal combining method for video enhancement is performed at the pixel level as explained below. The spatiotemporal combining method for video enhancement includes computing a standard deviation estimate between a video frame and a temporally neighboring frame of the video frame in the video sequence and computing an error value between a pixel value in a current video frame and corresponding motion compensated pixel value in a temporally neighboring video frame of the current video frame.

The method further includes computing a temporal weighting factor for each pixel as a function of the error value and the standard deviation estimate. In these embodiments, the temporal weighting factor for each pixel is computed as an exponential function of the error value and the standard deviation estimate. the temporal weighting factor is computed using the equation:

$$\alpha = e^{-\frac{K*(err\_pix)}{\sigma_{fr\_diff}(n-1)}}$$

where, $\alpha$ is the temporal weighting factor for a pixel, err_pix is the error value for the pixel, $\sigma_{fr\_diff}(n-1)$ is the standard deviation estimate, and k is a temporal filtering modulation factor.

Further, the method includes combining the pixel value in the current video frame and its corresponding motion compensated pixel value in the temporally neighboring video frame using the computed temporal weighting factor. In these embodiments, combining the pixel value in the current video frame and its corresponding motion compensated pixel value in the temporally neighboring video frame includes spatially combining pixel values in a spatial neighborhood of the pixel in the current video frame using a noise variance estimate of the video frame, and combining the spatially combined pixel value and its corresponding motion compensated pixel value in the temporally neighboring video frame using the computed temporal weighting factor.

Furthermore, the method includes computing an average of all the computed temporal weighting factors in the video frame, and estimating the noise variance estimate based on the computed average using the equation:

$$\sigma_n^2 = \sigma_{fr\_diff}^2/(2-c)$$

where $\sigma_n^2$ is the noise variance estimate, $\sigma_{fr\_diff}^2$ is the square of the standard deviation estimate, and c is the computed average of all the computed temporal weighting factors.

In accordance with the above described embodiments with respect to FIGS. 1-5, the spatiotemporal combining module 100 can be implemented as a stand-alone de-noiser or an encoder's in built de-noiser. For the encoder's in built de-noiser, additional motion information is available from the encoder.

In another embodiment, for both the stand-alone de-noiser and the encoder's in built de-noiser, the decision module 106 of the spatiotemporal combining module 100 determines whether a current block of pixels in a current video frame is qualified for the temporal filtering based on the following equation:

$$SSD_Y + SSD_U + SSD_V < K*(\sigma_{fr\_diff\_Y}^2 + \sigma_{fr\_diff\_U}^2 + \sigma_{fr\_diff\_V}^2)$$

where $SSD_Y$, $SSD_U$ and $SSD_V$ are the sum of squared difference between the cur_blk and prev_blk at 8×8 block level for Y and 4×4 block level for U and V components, and $\sigma_{fr\_diff\_Y,U,V}^2$ is the frame difference variance for each of the components, and K is a constant factor.

In another embodiment, for the encoder's in built de-noiser, in addition to the above mentioned check, the component SSD for the block of pixels has to exceed a threshold that models the quantization noise at the operating quantization scale factor of the encoder in order to qualify for IIR filtering since the encoder itself performs some level of de-noising during its quantization step.

The above mentioned spatiotemporal combining system and method is applied for video enhancement such as combining multiple video frames to form an enhanced still picture, reducing noise and improving resolution of a video frame and so on. The above mentioned spatiotemporal combining system and method is also applicable for any camera application such as video encoding, video conferencing, video surveillance, and mobile video recording. The encoder including the spatiotemporal combining module can be used in cameras to improve the encoded video quality.

Figure 6:
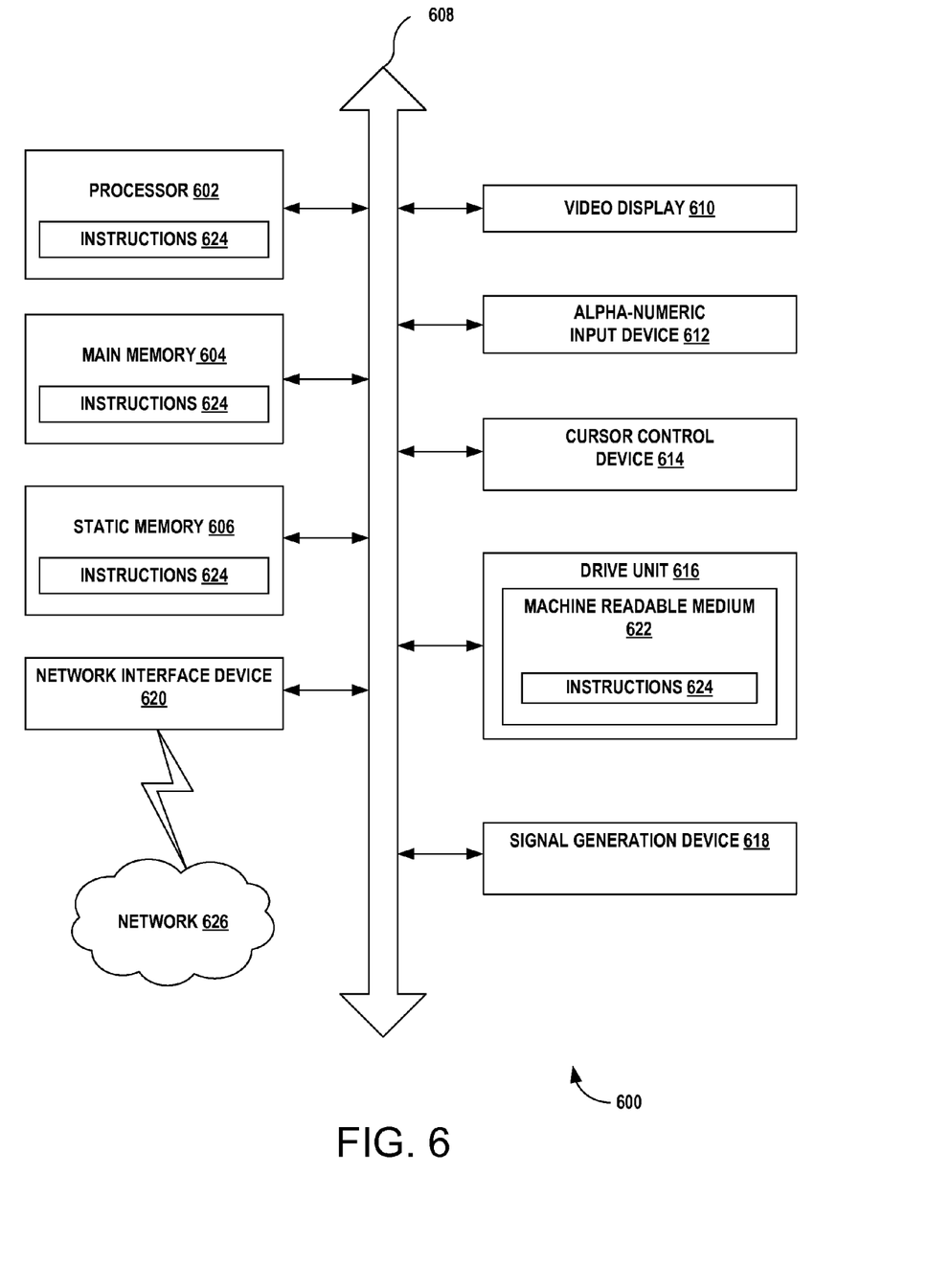
FIG. 6 is a diagrammatic system view of a data processing system in which any of the embodiments disclosed herein may be performed, according to one embodiment.

FIG. 6 is a diagrammatic system view 600 of a data processing system in which any of the embodiments disclosed herein may be performed, according to one embodiment. Particularly, the diagrammatic system view of FIG. 6 illustrates a processor 602, a main memory 604, a static memory 606, a bus 608, a video display 610, an alphanumeric input device 612, a cursor control device 614, a drive unit 616, a signal generation device 618, a network interface device 620, a machine readable medium 622, instructions 624 and a network 626.

The diagrammatic system view 600 may indicate a personal computer and/or a data processing system in which one or more operations disclosed herein are performed. The processor 602 may be a microprocessor, a state machine, an application specific integrated circuit, a field programmable gate array, etc. The main memory 604 may be a dynamic random access memory and/or a primary memory of a computer system. The static memory 606 may be a hard drive, a flash drive, and/or other memory information associated with the data processing system.

The bus 608 may be an interconnection between various circuits and/or structures of the data processing system. The video display 610 may provide graphical representation of information on the data processing system. The alphanumeric input device 612 may be a keypad, keyboard and/or any other input device of text (e.g., a special device to aid the physically handicapped). The cursor control device 614 may be a pointing device such as a mouse. The drive unit 616 may be a hard drive, a storage system, and/or other longer term storage subsystem.

The signal generation device 618 may be a BIOS and/or a functional operating system of the data processing system. The network interface device 620 may perform interface functions (e.g., code conversion, protocol conversion, and/or buffering) required for communications to and from the network 626 between a number of independent devices (e.g., of varying protocols). The machine readable medium 622 may provide instructions on which any of the methods disclosed herein may be performed. The instructions 624 may provide source code and/or data code to the processor 602 to enable any one or more operations disclosed herein.

An article comprising a computer readable storage medium having instructions thereon which when executed by a computing platform result in execution of the above mentioned method. The method described in the foregoing may be in a form of a machine-readable medium embodying a set of instructions that, when executed by a machine, causes the machine to perform any method disclosed herein. It will be appreciated that the various embodiments discussed herein may not be the same embodiment, and may be grouped into various other embodiments not explicitly disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A spatiotemporal combining method for video enhancement in each of the components of a video sequence, comprising:

computing a standard deviation estimate between a video frame and a temporally neighboring frame of the video frame in the video sequence;

computing an error value, for each sub-block of pixels within a block of pixels in a current video frame, between pixel values within the sub-block in the current video frame and corresponding motion compensated pixel values in a temporally neighboring video frame of the current video frame;

computing a temporal weighting factor for each sub-block of pixels as a function of the error value and the standard deviation estimate; and combining the block of pixels in the current video frame and their corresponding motion compensated pixel values in the temporally neighboring video frame using the computed temporal weighting factor of each sub-block of pixels in the block of pixels.

2. The method of claim 1, wherein computing the temporal weighting factor comprises:

computing a sum of sum of squared differences (Sum of SSDs) of the components in the block of pixels in the current video frame, between pixel values in the current video frame and the corresponding motion compensated pixel values in the temporally neighboring video frame of the current video frame;

determining whether the computed sum of SSDs of the components in the block of pixels in the current video frame is less than a factor of the sum of frame difference variance of the components, wherein the frame difference variance is the square of the standard deviation estimate for each of the components;

if so, computing the temporal weighting factor for each sub-block in the block of pixels as a function of the error value and the standard deviation estimate; and if not, assigning a zero value to the temporal weighting factor of each subblock in the block of pixels.

3. The method of claim 2, further comprising:

spatially combining a block of pixels in the current video frame of the video sequence using a noise variance estimate of the video frame and the pixel values within a spatial neighborhood in and around the block of pixels; and combining the spatially combined block of pixels and their corresponding motion compensated pixel values in the temporally neighboring video frame of the current video frame using the computed temporal weighting factor of each sub-block of pixels in the block of pixels.

4. The method of claim 1, wherein combining the block of pixels and their corresponding motion compensated pixel values in the temporally neighboring video frame comprises:

spatially combining a block of pixels in the current video frame of the video sequence using a noise variance estimate of the video frame and the pixel values within a spatial neighborhood in and around the block of pixels; and combining the spatially combined block of pixels and their corresponding motion compensated pixel values in the temporally neighboring video frame of the current video frame using the computed temporal weighting factor of each sub-block of pixels in the block of pixels.

5. The method of claim 4, wherein combining the spatially combined block of pixels and their corresponding motion compensated pixel values in the temporally neighboring video frame of the current video frame comprises:

estimating the motion correspondence between spatially combined block of component pixels in the current video frame and a matching block of component pixels in the temporally neighboring video frame of the current video frame, wherein the component pixels are selected from the group consisting of luminance pixels and chrominance pixels; and combining the spatially combined block of pixels and their corresponding motion compensated pixel values computed using the estimated correspondence between the spatially combined block of component pixels in the current video frame and the matching block of component pixels in the temporally neighboring video frame using the computed temporal weighting factor of each sub-block of pixels in the block of pixels.

6. The method of claim 1, wherein computing the temporal weighting factor for each sub-block of pixels, comprises:

computing the temporal weighting factor for each sub-block of pixels as an exponential function of the error value and the standard deviation estimate.

7. The method of claim 6, wherein the temporal weighting factor is computed using the equation:

$$\alpha = e^{-\frac{m*(err\_subblk)}{\sigma_{fr\_diff}}}$$

where, $\alpha$ is the temporal weighting factor for a sub-block of pixels, err_subblk is the error value for the sub-block, $\sigma_{fr\_diff}$ is the standard deviation estimate, and m is a temporal filtering modulation factor.

8. The method of claim 7, wherein the temporal filtering modulation factor is computed using the equation:

$$m = \frac{\mu blk * k + 128}{\mu blk + 128 * k}$$

where, $\mu blk$ is a spatial mean of the luminance component of the block of pixels in the current video frame, and k is a factor to control the level of modulation.

9. The method of claim 4, further comprising:

computing an average of all the computed temporal weighting factors in each component of the video frame; and estimating the noise variance estimate for each component based on the computed average using the equation:

$$\sigma_n^2 = \sigma_{fr\_diff}^2/(2-c)$$

where, $\sigma_n^2$ is the noise variance estimate of the component, $\sigma_{fr\_diff}^2$ is the square of the standard deviation estimate of the component, and c is the computed average of all the computed temporal weighting factors for the component.

10. The method of claim 1, wherein computing the standard deviation estimate comprises:

computing a standard deviation estimate between a region of pixels in a video frame and co-located region of pixels in a temporally neighboring frame of the video frame; and computing the temporal weighting factor for each sub-block of pixels in the region of pixels as a function of the error value and the computed standard deviation estimate.

11. A spatiotemporal combining method for video enhancement, comprising:

computing a standard deviation estimate between a video frame and a temporally neighboring frame of the video frame in the video sequence;

computing an error value, for each sub-block of pixels within a block of pixels in a current video frame, between pixel values within the sub-block in the current video frame and corresponding motion compensated pixel values in a temporally neighboring video frame of the current video frame;

computing a temporal weighting factor for each sub-block of pixels as a function of the error value and the standard deviation estimate;

repeating the steps of computing the error value and computing the temporal weighting factor for each sub-block of pixels with respect to one or more additional temporally neighboring video frames; and combining the block of pixels in the current video frame and their corresponding motion compensated pixel values in the temporally neighboring video frames using the computed temporal weighting factors of each sub-block of pixels in the block of pixels.

12. The method of claim 11, wherein computing the temporal weighting factor comprises:

computing sum of sum of squared differences (Sum of SSDs) of the components in the block of pixels in the current video frame, between pixel values in the current video frame and the corresponding motion compensated pixel values in the temporally neighboring video frame of the current video frame;

determining whether the computed sum of SSDs of the components in the block of pixels in the current video frame is less than a factor of the sum of frame difference variance of the components, wherein the frame difference variance is the square of the standard deviation estimate for each of the components;

if so, computing the temporal weighting factor for each sub-block of pixels as a function of the error value and the standard deviation estimate; and if not, assigning a zero value to the temporal weighting factor of each subblock in the block of pixels.

13. The method of claim 11, wherein combining the block of pixels and their corresponding motion compensated pixel values in the temporally neighboring video frame comprises:

spatially combining a block of pixels in the current video frame of the video sequence using a noise variance estimate of the video frame and the pixel values within a spatial neighborhood in and around the block of pixels; and combining the spatially combined block of pixels and their corresponding motion compensated pixel values in the temporally neighboring video frames of the current video frame using the computed temporal weighting factors of each subblock of pixels in the block of pixels.

14. The method of claim 13, further comprising:
computing an average of all the computed temporal weighting factors in each component of the video frame; and
estimating the noise variance estimate for each component based on the computed average using the equation:

$$\sigma_n^2 = \sigma_{fr\_diff}^2/(2-c)$$

where, $\sigma_n^2$ is the noise variance estimate of the component, $\sigma_{fr\_diff}^2$ is the square of the standard deviation estimate of the component, and c is the computed average of all the computed temporal weighting factors for the component.

15. The method of claim 11, wherein computing the temporal weighting factor for each sub-block of pixels, comprises:
computing the temporal weighting factor for each sub-block of pixels as an exponential function of the error value and the standard deviation estimate.

16. A spatiotemporal combining method for video enhancement, comprising:
computing a standard deviation estimate between a video frame and a temporally neighboring frame of the video frame in the video sequence;
computing an error value between a pixel value in a current video frame and corresponding motion compensated pixel value in a temporally neighboring video frame of the current video frame;
computing a temporal weighting factor for each pixel as a function of the error value and the standard deviation estimate; and
combining the pixel value in the current video frame and its corresponding motion compensated pixel value in the temporally neighboring video frame using the computed temporal weighting factor.

17. The method of claim 16, wherein combining the pixel value in the current video frame and its corresponding motion compensated pixel value in the temporally neighboring video frame comprises:
spatially combining pixel values in a spatial neighborhood of the pixel in the current video frame using a noise variance estimate of the video frame; and
combining the spatially combined pixel value and its corresponding motion compensated pixel value in the temporally neighboring video frame using the computed temporal weighting factor.

18. The method of claim 17, further comprising:
computing an average of all the computed temporal weighting factors in the video frame; and
estimating the noise variance estimate based on the computed average using the equation:

$$\sigma_n^2 = \sigma_{fr\_diff}^2/(2-c)$$

where, $\sigma_n^2$ is the noise variance estimate, $\sigma_{fr\_diff}^2$ is the square of the standard deviation estimate, and c is the computed average of all the computed temporal weighting factors.

19. The method of claim 16, wherein computing the temporal weighting factor for each pixel, comprises:
computing the temporal weighting factor for each pixel as an exponential function of the error value and the standard deviation estimate.

20. The method of claim 19, wherein the temporal weighting actor is computed using the equation:

$$\alpha = e^{-\frac{K*(err\_pix)}{\sigma_{fr\_diff}(n-1)}}$$

where, $\alpha$ is the temporal weighting factor for a pixel, err_pix is the error value for the pixel, $\sigma_{fr\_diff}(n-1)$ is the standard deviation estimate, and k is a temporal filtering modulation factor.

21. An article comprising a computer readable storage medium having instructions thereon which when executed by a computing platform result in execution of a spatiotemporal combining method for video enhancement in each of the components of a video sequence, comprising:
computing a standard deviation estimate between a video frame and a temporally neighboring frame of the video frame in the video sequence;
computing an error value, for each sub-block of pixels within a block of pixels in a current video frame, between pixel values within the sub-block in the current video frame and corresponding motion compensated pixel values in a temporally neighboring video frame of the current video frame;
computing a temporal weighting factor for each sub-block of pixels as a function of the error value and the standard deviation estimate; and
combining the block of pixels in the current video frame and their corresponding motion compensated pixel values in the temporally neighboring video frame using the computed temporal weighting factor of each sub-block of pixels in the block of pixels.

22. The article of claim 21, wherein combining the block of pixels and their corresponding motion compensated pixel values in the temporally neighboring video frame comprises:
spatially combining a block of pixels in the current video frame of the video sequence using a noise variance estimate of the current video frame and the pixel values within a spatial neighborhood in and around the block of pixels; and
combining the spatially combined block of pixels and their corresponding motion compensated pixel values in the temporally neighboring video frame of the current video frame using the computed temporal weighting factor of each sub-block of pixels in the block of pixels.

23. An article comprising a computer readable storage medium having instructions thereon which when executed by a computing platform result in execution of a spatiotemporal combining method for video enhancement, comprising:
computing a standard deviation estimate between a video frame and a temporally neighboring frame of the video frame in the video sequence;
computing an error value, for each sub-block of pixels within a block of pixels in a current video frame, between pixel values within the sub-block in the current video frame and corresponding motion compensated pixel values in a temporally neighboring video frame of the current video frame;
computing a temporal weighting factor for each sub-block of pixels as a function of the error value and the standard deviation estimate;
repeating the steps of computing the error value and computing the temporal weighting factor for each sub-block of pixels with respect to one or more additional temporally neighboring video frames; and combining the block of pixels in the current video frame and their corresponding motion compensated pixel values in the temporally neighboring video frames using the computed temporal weighting factors of each sub-block of pixels in the block of pixels.

24. The article of claim 23, wherein combining the block of pixels and their corresponding motion compensated pixel values in the temporally neighboring video frame comprises:
spatially combining a block of pixels in the current video frame of the video sequence using a noise variance estimate of the video frame and the pixel values within a spatial neighborhood in and around the block of pixels;
combining the spatially combined block of pixels and their corresponding motion compensated pixel values in the temporally neighboring video frames of the current video frame using the computed temporal weighting factors of each subblock of pixels in the block of pixels.

25. An article comprising a computer readable storage medium having instructions thereon which when executed by a computing platform result in execution of a spatiotemporal combining method for video enhancement, comprising:
computing a standard deviation estimate between a video frame and a temporally neighboring frame of the video frame in the video sequence;
computing an error value between a pixel value in a current video frame and corresponding motion compensated pixel value in a temporally neighboring video frame of the current video frame;
computing a temporal weighting factor for each pixel as a function of the error value and the standard deviation estimate; and
combining the pixel value in the current video frame and its corresponding motion compensated pixel value in the temporally neighboring video frame using the computed temporal weighting factor.

26. The article of claim 25, wherein combining the pixel value and their corresponding motion compensated pixel value in the temporally neighboring video frame comprises:
spatially combining pixel values in a spatial neighborhood of the pixel in the current video frame using a noise variance estimate of the video frame; and
combining the spatially combined pixel value and its corresponding motion compensated pixel value in the temporally neighboring video frame using the computed temporal weighting factor.

27. A video encoder, comprising:
a video encoding module; and
a spatiotemporal combining module coupled to the video encoding module, wherein the spatiotemporal combining module comprises:
a motion compensated temporal filtering module to compute a standard deviation estimate between a video frame and a temporally neighboring frame of the video frame in the video sequence, wherein the motion compensated temporal filtering module computes an error value, for each sub-block of pixels within a block of pixels in a current video frame, between pixel values within the sub-block in the current video frame and corresponding motion compensated pixel values in a temporally neighboring video frame of the current video frame, wherein the motion compensated temporal filtering module computes a temporal weighting factor for each subblock of pixels as a function of the error value and the standard deviation estimate, and wherein the motion compensated temporal filtering module combines the block of pixels in the current video frame and their corresponding motion compensated pixel values in the temporally neighboring video frame using the computed temporal weighting factor of each sub-block of pixels in the block of pixels.

28. The video encoder of claim 27, wherein the spatiotemporal combining module comprises:
a decision module to compute sum of sum of squared differences (Sum of SSDs) of the components in the block of pixels in the current video frame, between pixel values in the current video frame and the corresponding motion compensated pixel values in the temporally neighboring video frame of the current video frame, and wherein the decision module determines whether the computed sum of SSDs of the components in the block of pixels in the current video frame is less than a factor of the sum of frame difference variance of the components, wherein the frame difference variance is the square of the standard deviation estimate for each of the components,
wherein the motion compensated temporal filtering module computes the temporal weighting factor for each sub-block of pixels as a function of the error value and the standard deviation estimate, if the computed sum of SSDs of the components in the block of pixels in the current video frame is less than the factor of the sum of frame difference variance of the components, and the motion compensated temporal filtering module sets the temporal weighting factor for each sub-block in the block of pixels to zero if the computed sum of SSDs of the components in the block of pixels in the current video frame is greater than or equal to the factor of the sum of frame difference variance of the components.

29. The video encoder of claim 27, wherein the spatiotemporal combining module further comprises:
a spatial combining module to spatially combine a block of pixels in the current video frame of the video sequence using a noise variance estimate of the current video frame and the pixel values within a spatial neighborhood in and around the block of pixels, and wherein the motion compensated temporal filtering module combines the spatially combined block of pixels and their corresponding motion compensated pixel values in the temporally neighboring video frame of the current video frame using the computed temporal weighting factor of each subblock of pixels in the block of pixels.

30. The video encoder of claim 29, further comprising:
a motion estimation module to estimate the motion correspondence between spatially combined block of component pixels in the current video frame and a matching block of component pixels in the temporally neighboring video frame of the current video frame, wherein the component pixels are selected from the group consisting of luminance pixels and chrominance pixels, and wherein the motion compensated temporal filtering module combines the spatially combined block of pixels and their corresponding motion compensated pixel values computed using the estimated correspondence between the spatially combined block of component pixels in the current video frame and the matching block of component pixels in the temporally neighboring video frame using the computed temporal weighting factor of each sub-block of pixels in the block of pixels.

31. The video encoder of claim 27, wherein the motion compensated temporal filtering module computes the temporal weighting factor for each sub-block of pixels as an exponential function of the error value and the standard deviation estimate.

32. A spatiotemporal combining module for video enhancement, comprising
- a motion compensated temporal filtering module to compute a standard deviation estimate between a video frame and a temporally neighboring frame of the video frame in the video sequence, wherein the motion compensated temporal filtering module computes an error value, for each sub-block of pixels within a block of pixels in a current video frame, between pixel values within the sub-block in the current video frame and corresponding motion compensated pixel values in a temporally neighboring video frame of the current video frame, wherein the motion compensated temporal filtering module computes a temporal weighting factor for each sub-block of pixels as a function of the error value and the standard deviation estimate, and wherein the motion compensated temporal filtering module combines the block of pixels in the current video frame and their corresponding motion compensated pixel values in the temporally neighboring video frame using the computed temporal weighting factor of each sub-block of pixels in the block of pixels.

33. The spatiotemporal combining module of claim 32, further comprising:
- a decision module to compute sum of sum of squared differences (Sum of SSDs) of the components in the block of pixels in the current video frame, between pixel values in the current video frame and the corresponding motion compensated pixel values in the temporally neighboring video frame of the current video frame, and wherein the decision module determines whether the computed sum of SSDs of the components in the block of pixels in the current video frame is less than a factor of the sum of frame difference variance of the components, wherein the frame difference variance is the square of the standard deviation estimate for each of the components,
- wherein the motion compensated temporal filtering module computes the temporal weighting factor for each sub-block of pixels as a function of the error value and the standard deviation estimate, if the computed sum of SSDs of the components in the block of pixels in the current video frame is less than the factor of the sum of frame difference variance of the components, and the motion compensated temporal filtering module sets the temporal weighting factor for each sub-block in the block of pixels to zero if the computed sum of SSDs of the components in the block of pixels in the current video frame is greater than or equal to the factor of the sum of frame difference variance of the components.

34. The spatiotemporal combining module of claim 33, further comprising:
- a spatial combining module to spatially combine a block of pixels in the current video frame of the video sequence using a noise variance estimate of the current video frame and the pixel values within a spatial neighborhood in and around the block of pixels, and wherein the motion compensated temporal filtering module combines the spatially combined block of pixels and their corresponding motion compensated pixel values in the temporally neighboring video frame of the current video frame using the computed temporal weighting factor of each sub-block of pixels in the block of pixels.

35. The spatiotemporal combining module of claim 34, further comprising:
- a motion estimation module to estimate the motion correspondence between spatially combined block of component pixels in the current video frame and a matching block of component pixels in the temporally neighboring video frame of the current video frame, wherein the component pixels are selected from the group consisting of luminance pixels and chrominance pixels, and wherein the motion compensated temporal filtering module combines the spatially combined block of pixels and their corresponding motion compensated pixel values computed using the estimated correspondence between the spatially combined block of component pixels in the current video frame and the matching block of component pixels in the temporally neighboring video frame using the computed temporal weighting factor of each sub-block of pixels in the block of pixels.

* * * * *